(12) United States Patent
Meier et al.

(10) Patent No.: US 8,145,418 B2
(45) Date of Patent: Mar. 27, 2012

(54) SYSTEMS AND METHODS FOR IMPROVING MAGNETIC HEADING OUTPUT FROM AN INERTIAL NAVIGATION SYSTEM

(75) Inventors: Ben Meier, Shakopee, MN (US); Jeffrey E. Love, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 863 days.

(21) Appl. No.: 12/121,610

(22) Filed: May 15, 2008

(65) Prior Publication Data

US 2009/0287413 A1    Nov. 19, 2009

(51) Int. Cl.
G01C 21/00 (2006.01)
(52) U.S. Cl. ................... 701/216; 701/224; 702/93
(58) Field of Classification Search ............ 701/216, 701/224, 500, 501; 702/93
See application file for complete search history.

(56) References Cited

U.S. PATENT DOCUMENTS

| | | | |
|---|---|---|---|
| 4,303,978 A | | 12/1981 | Shaw et al. |
| 5,173,709 A | | 12/1992 | Lauro et al. |
| 5,761,094 A | | 6/1998 | Olson et al. |
| 6,408,251 B1 | * | 6/2002 | Azuma ............... 702/92 |
| 7,146,740 B2 | * | 12/2006 | Manfred ............. 33/356 |
| 2002/0100178 A1 | * | 8/2002 | Smith et al. ......... 33/356 |
| 2003/0135327 A1 | | 7/2003 | Levine et al. |
| 2004/0123474 A1 | | 7/2004 | Manfred et al. |
| 2005/0246099 A1 | | 11/2005 | Jendbro et al. |
| 2005/0288858 A1 | * | 12/2005 | Amer et al. .......... 701/211 |
| 2006/0224281 A1 | | 10/2006 | Foucart et al. |
| 2008/0052932 A1 | | 3/2008 | Xue et al. |

FOREIGN PATENT DOCUMENTS

| | | |
|---|---|---|
| DE | 29716732 | 1/1999 |
| DE | 10147502 | 2/2003 |

OTHER PUBLICATIONS

European Patent Office, "European Search Report", Oct. 20, 2009, Published in: EP.
"NOAA National Geophysical Data Center: Declination Calculator", "www.ngdc.noaa.gov/geomagmodels/Declination. jsp", May 12, 2004, Publisher: National Geophysical Data Center.
"The World Magnetic Model", "www.ngdc.noaa.gov/scg/WMM/back.shtml", Nov. 17, 2005, pp. 1-2. Publisher: National Geophysical Data Center.
McLean et al., "The US/UK World Magnetic Model for 2005-2010", Dec. 2004, pp. 1-71, Publisher: NOAA National Geophysical Data Center.

* cited by examiner

*Primary Examiner* — Mark Hellner
(74) *Attorney, Agent, or Firm* — Fogg & Powers LLC

(57) ABSTRACT

Systems and methods for determining magnetic heading information for a vehicle. In one example, the system identifies at least one polar exclusion area based on predefined rate-of-change of magnetic variation (magvar). Locally stored magvar information is retrieved based on received vehicle position information that is outside the polar exclusion areas. Magnetic heading is determined based on the retrieved magvar information, the received position information, and the received true heading information. In another example, the magnetic heading is determined based on the retrieved magvar and magvar rate-of-change information, on the received vehicle position and true heading information, and on the received date information. In another example, the magnetic heading is determined based on the received vehicle position, true heading, and date information, and on the magvar retrieved from a world magnetic model utilizing stored model coefficients.

20 Claims, 6 Drawing Sheets

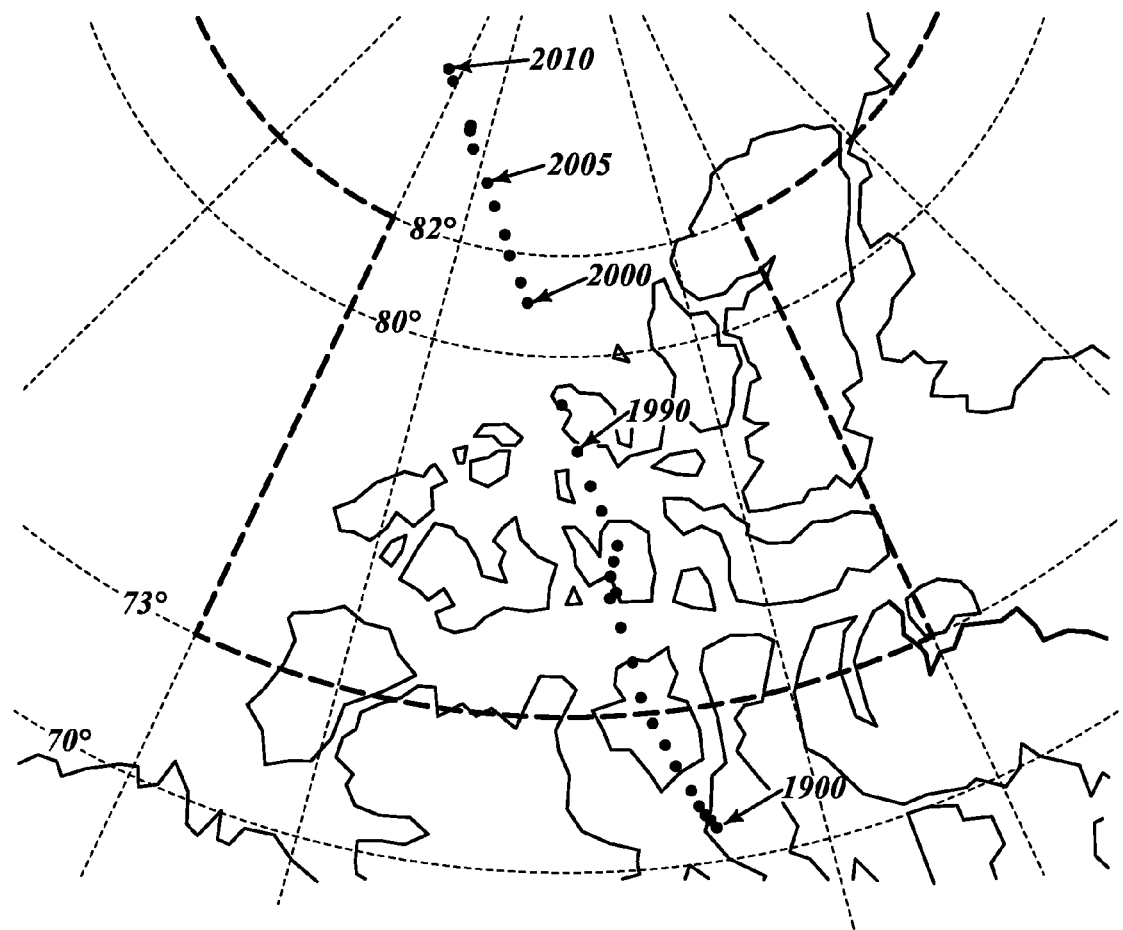
FIG. 2-1 *(PRIOR ART)*

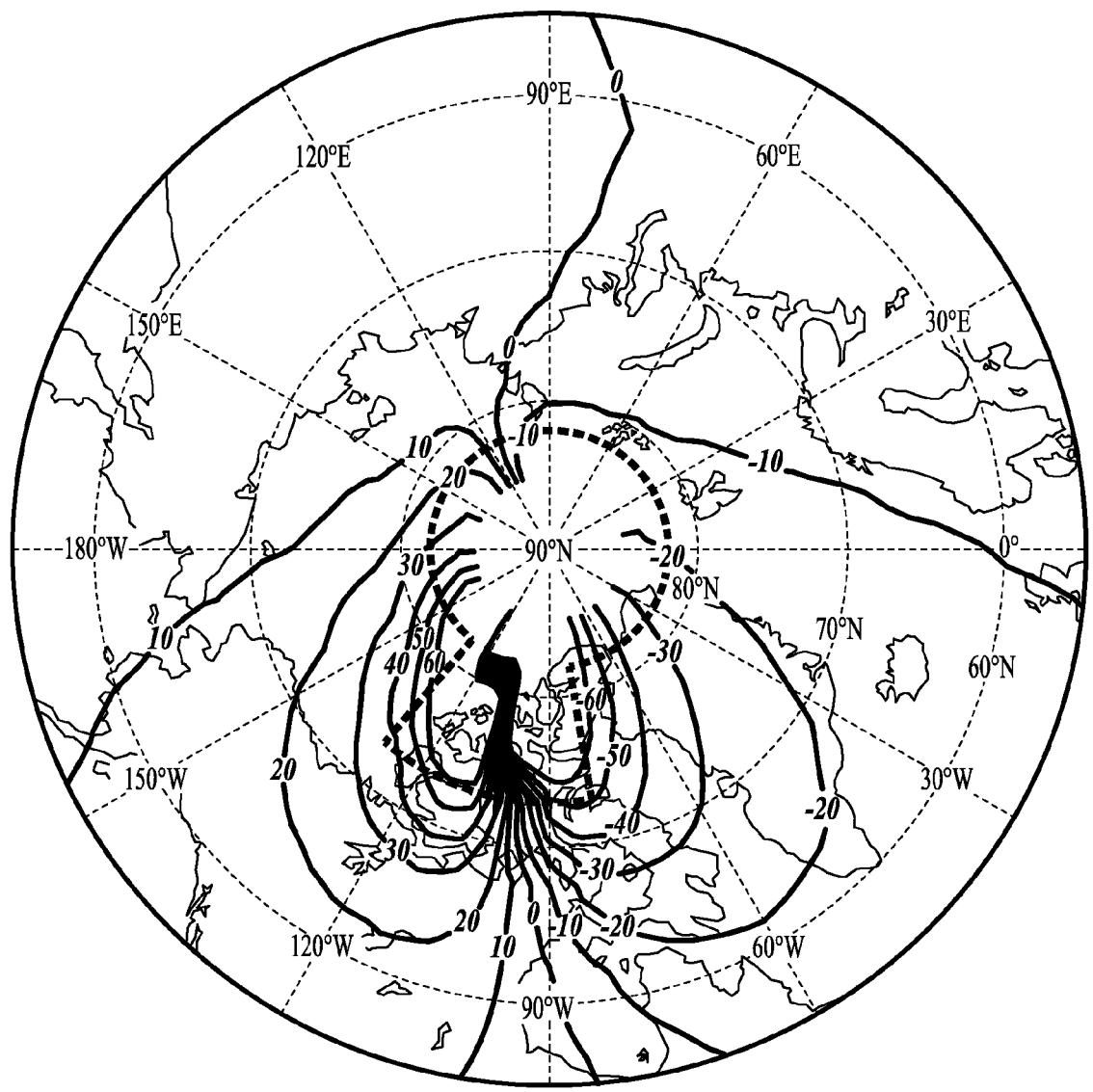
FIG. 2-2 *(PRIOR ART)*

SYSTEMS AND METHODS FOR IMPROVING MAGNETIC HEADING OUTPUT FROM AN INERTIAL NAVIGATION SYSTEM

BACKGROUND OF THE INVENTION

Magnetic heading that is produced by current inertial navigation systems (INS) is not meeting predefined required accuracy specifications. This can be an issue when an aircraft is trying to align itself with a runway because runway headings are typically provided as a magnetic heading.

The magnetic heading provided by current INSs is synthesized from INS true heading, INS position, and magnetic variation (magvar) that is derived from a static lookup table (LUT). The magnetic heading accuracy specification (e.g., TSO-C6d; AS8013) states that the magnetic heading will meet a given accuracy (typically 2 to 3 degrees) for a given duration in time (typically 10 years) for the specified magvar LUT.

A static magvar LUT can prevent the INS from meeting the magnetic heading accuracy specifications for dates sufficiently far from the magvar LUT optimization date. This has become more common in recent years due to the drift of the location of the north magnetic pole, the geometry of the magvar LUT polar exclusion areas (FIG. 2-1), and the high rate-of-change of the magnetic variation near the polar exclusion areas (FIG. 2-2).

SUMMARY OF THE INVENTION

The present invention provides systems and methods for determining magnetic heading information for a vehicle. In one aspect of the invention, the system receives vehicle position and true heading information and identifies at least one polar exclusion area based on predefined magnetic variation (magvar) rate-of-change information. Magnetic heading of the vehicle is then determined when the position is outside identified polar exclusion areas based on locally stored magvar information and the received position and true heading information.

In another aspect of the invention, the system receives vehicle position, true heading, and current date information. Locally stored magvar information and magvar rate-of-change information is retrieved based on the received position information. The magnetic heading of the vehicle is determined based on the retrieved magvar and magvar rate-of-change information and on the received date and true heading information.

In still another aspect of the invention, a system receives vehicle position, true heading, and current date information. Magnetic heading of the vehicle is determined based on the received position information, the received date information, the received true heading information, and magnetic variation produced by a world magnetic model using previously stored world magnetic model coefficients.

In yet another aspect of the invention, a system receives vehicle position information and identifies at least one polar exclusion area based on predefined magvar rate-of-change information. Current date information and true heading is also received. Magnetic heading of the vehicle is determined when the position is outside the identified polar exclusion areas based on the received position, date, and true heading information, and on the retrieved magvar and magvar rate-of-change information.

In still yet another aspect of the invention, a system receives vehicle position information and identifies at least one polar exclusion area based on predefined magvar rate-of-change information. Current date and true heading information is also received. Magnetic heading of the vehicle is determined when the position is outside the identified polar exclusion areas based on the received position, date, and true heading information, and on the magnetic variation produced by a world magnetic model using previously stored world magnetic model coefficients.

BRIEF DESCRIPTION OF THE DRAWINGS

Preferred and alternative embodiments of the present invention are described in detail below with reference to the following drawings:

FIG. 2-1 illustrates the magnetic north pole migration over a period of years and the geometry of a traditional polar exclusion area;

FIG. 2-2 illustrates high rate-of-change in magvar near a polar exclusion areas (contour lines are spaced at 10 arc minutes per year rate-of-change)

DETAILED DESCRIPTION OF THE INVENTION

Figure 1:
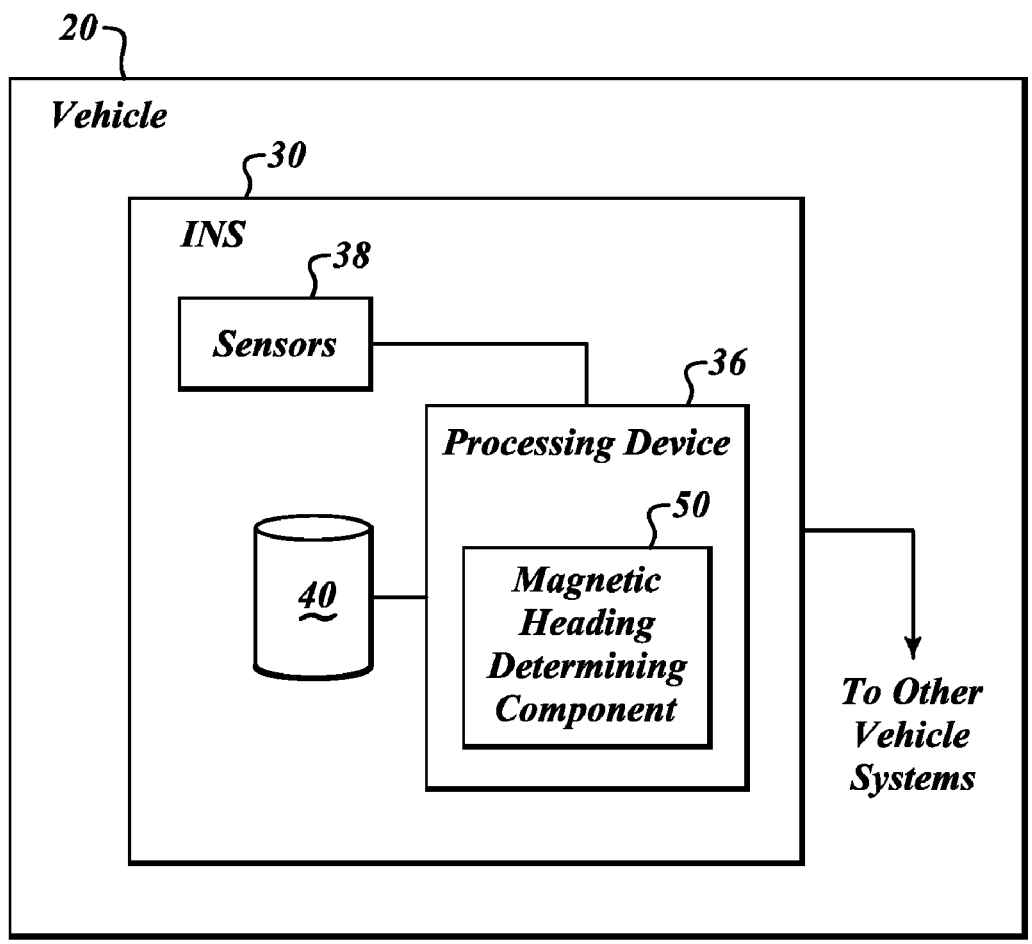
FIG. 1 illustrates a schematic block diagram of a vehicle configured in accordance with an embodiment of the present invention.

As shown in FIG. 1, a vehicle 20 includes an example inertial navigation system (INS) 30 that produces improved magnetic heading information. The INS 30 includes a processing device 36 having a corresponding database 40. The processing device 36 is coupled to a number of different sensors 38, either within the INS 30 or external to the INS 30, such as a global positioning system (GPS) (not shown). The processing device 36 includes a magnetic heading determining component 50.

The magnetic heading determining component 50 receives position and true heading information from other components within the INS 30 or from external or internal sensors 38. The magnetic heading determining component 50 uses the received true heading and position information along with magnetic variation (magvar) information or world magnetic model coefficient information stored in the database 40 in order to generate an improved magnetic heading value for the vehicle 20. The vehicle 20 may be any vehicle requiring navigation information, such as aircraft, or surface or subsurface vehicles.

Figure 3:
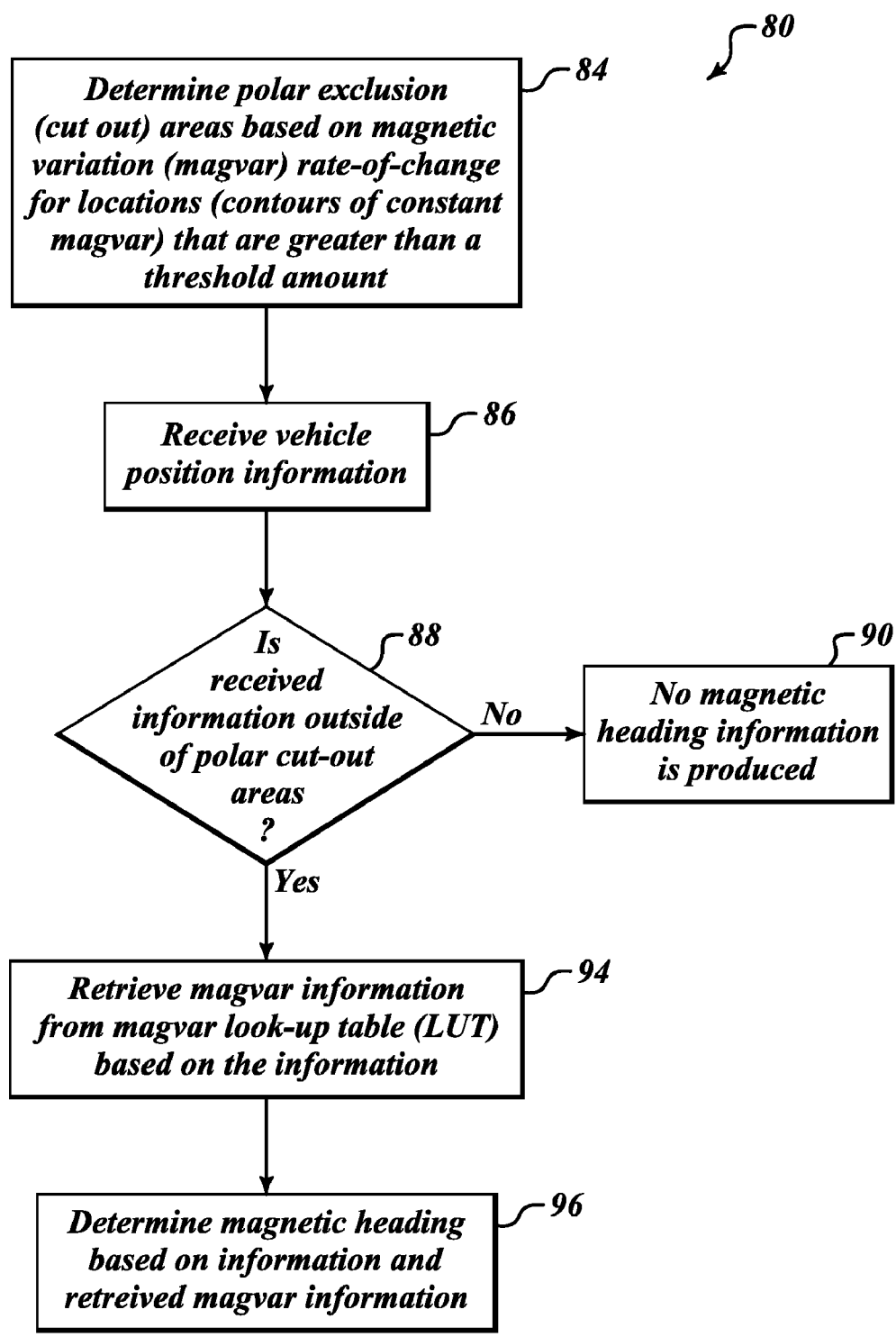
FIGS. 3-5 illustrate flow diagrams of example processes performed by the system shown in FIG. 1 according to various embodiments.

FIG. 3 illustrates an example process 80 performed by the magnetic heading determining component 50 shown in FIG. 1. First, at a block 84, polar exclusion (cut-out) areas are predetermined based on magvar rate-of-change for global locations that are greater than a threshold amount. This can be performed by receiving magvar rate-of-change information from a qualified authority such as the National Oceanographic and Atmospheric Administration (NOAA) (NOAA Technical Report NESDIS/NGDC-1). The exclusion areas can be defined by contours of constant magvar rate-of-change on the globe in the vicinity of the magnetic poles. For example, one might select the threshold of the magvar rate-of-change as being an absolute value of 50 minutes of arc per year rate-of-change. Therefore, contours on the map that would match with either −50 minutes of arc per year rate-of-change or +50 minutes of arc per year rate-of-change would be excluded within an area defined by those contours on the globe that would include all rates-of-change that are higher than +50 or −50 minutes of arc per year rate-of-change.

Then, at a block 86, the magnetic heading determining component 50 receives vehicle position information and true heading information from other preexisting components of the INS 30. Next, at a decision block 88, the magnetic heading determining component 50 compares the received position information to the predetermined polar exclusion areas. If the position information was determined to be within one of the polar exclusion areas, then, at a block 90, the INS 30 will not produce magnetic heading information. If the magnetic heading determining component 50 determined at the decision block 88 that the position information was outside of the polar exclusion areas, then, at a block 94, magvar information that is stored in a magvar look up table (LUT) within the database 40 is retrieved. The retrieved magvar information is based on the previously received position information. Next, at a block 96, the magnetic heading of the vehicle 20 is determined based on the received position and true heading information and the retrieved magvar information from the magvar LUT. Therefore, the magnetic heading information outputted by the INS 30 will not be performed in locations where the magnetic heading accuracy would be highly questionable. Polar exclusion areas based on magvar rate-of-change produce more effective cut-out regions, thereby improving the accuracy of the magnetic heading output of the INS 30. These new polar exclusion areas remove more areas that cause mag heading errors than the old cutouts.

Figure 4:
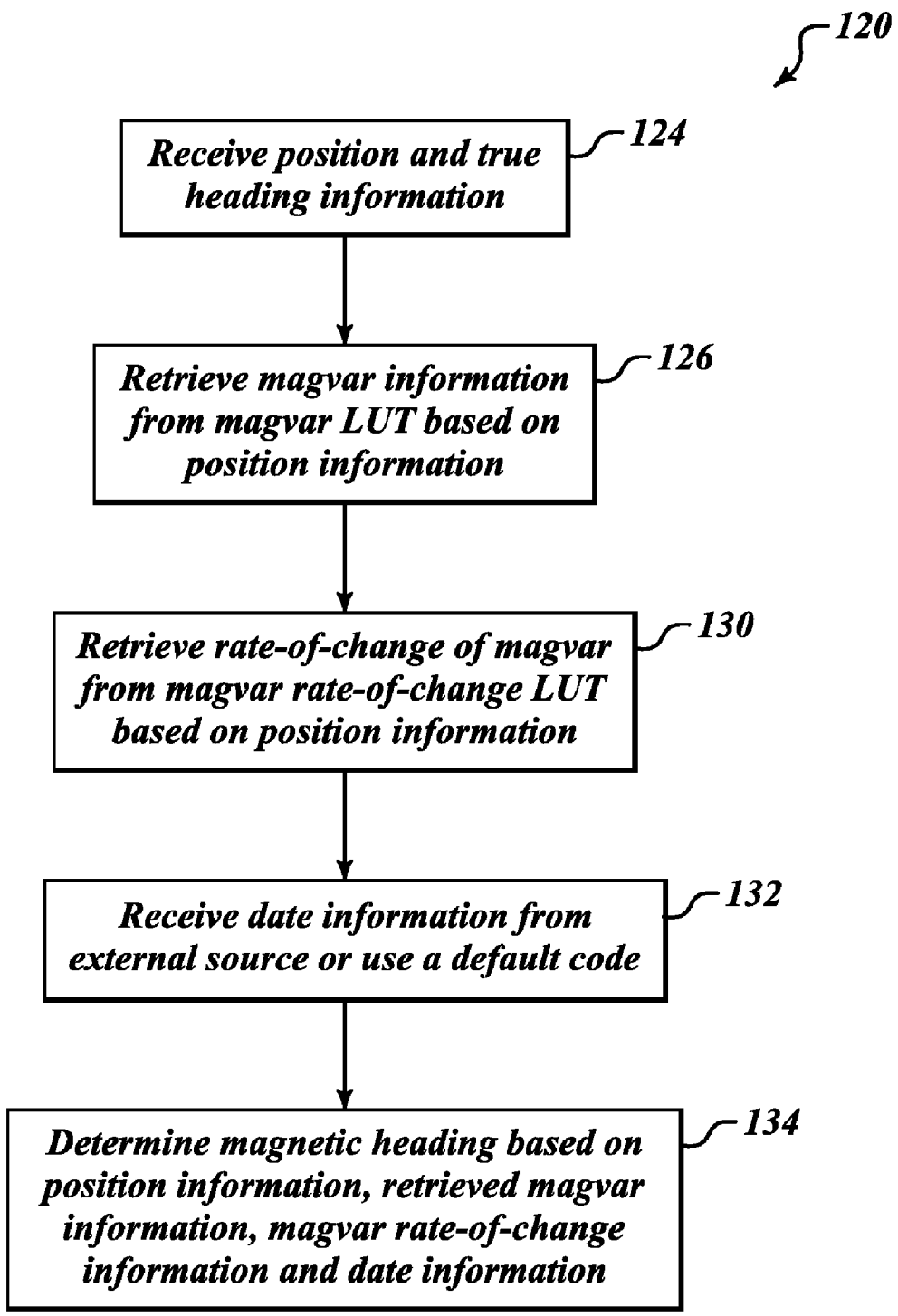

FIG. 4 illustrates a flowchart of another example process 120 performed separately or in combination with the process shown in FIG. 3. At a block 124, the magnetic heading determining component 50 receives position and true heading information of the vehicle 20. At a block 126, magvar information stored in a magvar LUT within the database 40 is retrieved based on the received position information. This can be done before or after polar exclusion areas have been taken into consideration. Next, at a block 130, rate-of-change of magvar is retrieved from a magvar rate-of-change LUT based on the position information. Then, at a block 132, date information is retrieved from an external source, such as a GPS, or a default date value is retrieved from a prestored location within the magnetic heading determining component 50, the processor device 36, or the database 40. Then, at a block 134, the magnetic heading determining component 50 determines magnetic heading based on the received position information, magvar information, magvar rate-of-change information, true heading information, and the date information. The process 120 produces more accurate magnetic heading information because the static magvar information that is stored in the LUT is corrected based on the date and the magvar rate-of-change information. For example, if the magvar information retrieved from the magvar LUT is 5 years old based on the retrieved date information, that magvar information is corrected based on the retrieved magvar rate-of-change information and the date.

The steps performed blocks 126, 130, and 132 are all independent, and could be performed in any order.

Figure 5:
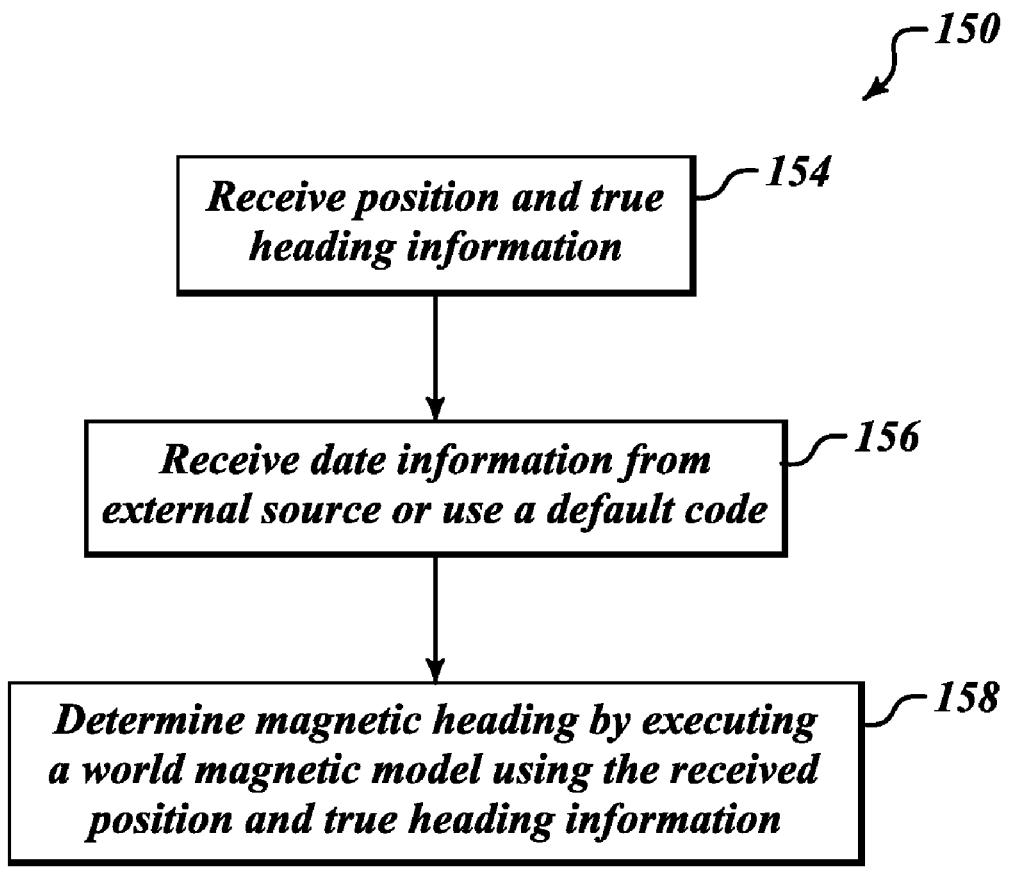

FIG. 5 illustrates another process 150 for improving upon the magnetic heading information produced by the INS 30. First, at a block 154 a magnetic heading determining component 50 receives position and true heading information such as that described above further for the processes shown in FIGS. 3 and 4. At a block 156, date information is received, similar to that described above in block 132 of FIG. 4. This can be done before or after polar exclusion areas have been taken into consideration. Next, at a block 158, magnetic heading information is determined by executing a world magnetic model using prestored coefficients (in the database 40), the received position and true heading information, and the date information. The world magnetic model is provided by National Oceanic and Atmospheric Administration (NOAA). It is a degree and order 12 spherical-harmonic main field model that includes 168 spherical-harmonic Gauss coefficients and degree and order 12 spherical-harmonic secular-variation field model (NOAA Technical Report NESDIS/NGDC-1).

While the preferred embodiment of the invention has been illustrated and described, as noted above, many changes can be made without departing from the spirit and scope of the invention. The processes described above may be combined in any combination or order. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for determining magnetic heading information for a vehicle, the system comprising:
   a means for receiving vehicle position information;
   a means for receiving true heading information;
   a means for retrieving locally stored magnetic variation information and rate-of-change of magnetic variation information based on the received position information;
   a means for receiving date information from a date source; and
   a means for determining magnetic heading of the vehicle based on the received vehicle position information, the received true heading information, the retrieved magnetic variation information, the retrieved rate-of-change of magnetic variation, and the received date information.

2. The system of claim 1, wherein the date source includes a global positioning system.

3. The system of claim 2, further comprising a means for identifying at least one polar exclusion area based on predefined rate-of-change of magnetic variation, wherein the means for retrieving locally stored magnetic variation information and rate-of-change of magnetic variation information is further based on the identified at least one polar exclusion area.

4. The system of claim 1, wherein the date source includes a default date value stored in local memory.

5. The system of claim 4, further comprising a means for identifying at least one polar exclusion area based on predefined rate-of-change of magnetic variation, wherein the means for retrieving locally stored magnetic variation information and rate-of-change of magnetic variation information is further based on the identified at least one polar exclusion area.

6. A system for determining magnetic heading information for a vehicle, the system comprising:
   a means for identifying at least one polar exclusion area based on predefined rate-of-change of magnetic variation;
   a means for receiving vehicle position information;
   a means for receiving true heading information;
   a means for retrieving locally stored magnetic variation information based on the received position information and the identified at least one polar exclusion area; and
   a means for determining magnetic heading of the vehicle based on the received vehicle position information, the received true heading information, and the retrieved magnetic variation.

7. A system for determining magnetic heading information for a vehicle, the system comprising:
   a means for receiving vehicle position information;
   a means for receiving true heading information;

a means for receiving date information from a date source; and a means for determining magnetic heading of the vehicle based on the received vehicle position information, the received true heading information, the received date information, and previously stored world magnetic model coefficients.

8. The system of claim 7, wherein the date source includes a global positioning system.

9. The system of claim 8, further comprising a means for identifying at least one polar exclusion area based on predefined rate-of-change of magnetic variation, wherein the means for determining magnetic heading of the vehicle is further based on the identified at least one polar exclusion area.

10. The system of claim 7, wherein the date source includes a default date value stored in local memory.

11. The system of claim 10, further comprising a means for identifying at least one polar exclusion area based on predefined rate-of-change of magnetic variation, wherein the means for determining magnetic heading of the vehicle is further based on the identified at least one polar exclusion area.

12. A method for determining magnetic heading information for a vehicle, the method comprising:
    receiving vehicle position information;
    receiving true heading information;
    retrieving locally stored magnetic variation information and rate-of-change of magnetic variation information based on the received position information;
    receiving date information from a date source; and
    determining magnetic heading of the vehicle based on the received vehicle position information, the received true heading information, the retrieved magnetic variation information, the retrieved rate-of-change of magnetic variation, and the received date information.

13. The method of claim 12, wherein the date source includes a global positioning method.

14. The method of claim 13, further comprising identifying at least one polar exclusion area based on predefined rate-of-change of magnetic variation, wherein retrieving locally stored magnetic variation information and rate-of-change of magnetic variation information is further based on the identified at least one polar exclusion area.

15. The method of claim 12, wherein the date source includes a default date value stored in local memory.

16. The method of claim 15, further comprising identifying at least one polar exclusion area based on predefined rate-of-change of magnetic variation, wherein retrieving locally stored magnetic variation information and rate-of-change of magnetic variation information is further based on the identified at least one polar exclusion area.

17. A method for determining magnetic heading information for a vehicle, the method comprising:
    identifying at least one polar exclusion area based on predefined rate-of-change of magnetic variation;
    receiving vehicle position information;
    receiving true heading information;
    retrieving locally stored magnetic variation information based on the received position information and the identified at least one polar exclusion area; and
    determining magnetic heading of the vehicle based on the received vehicle position information, the received true heading information, and the retrieved magnetic variation.

18. A method for determining magnetic heading information for a vehicle, the method comprising:
    receiving vehicle position information;
    receiving true heading information;
    receiving date information from a date source; and
    determining magnetic heading of the vehicle based on the received vehicle position information, the received true heading information, the received date information, and previously stored world magnetic model coefficients.

19. The method of claim 18, wherein the date source includes a global positioning method, further comprising identifying at least one polar exclusion area based on predefined rate-of-change of magnetic variation, wherein determining magnetic heading of the vehicle is further based on the identified at least one polar exclusion area.

20. The method of claim 18, wherein the date source includes a default date value stored in local memory, further comprising identifying at least one polar exclusion area based on predefined rate-of-change of magnetic variation, wherein determining magnetic heading of the vehicle is further based on the identified at least one polar exclusion area.

* * * * *